US006482880B1

(12) United States Patent
Rock

(10) Patent No.: US 6,482,880 B1
(45) Date of Patent: Nov. 19, 2002

(54) POLY(BIPHENYL ETHER SULFONE) RESINS HAVING IMPROVED UV YELLOWING RESISTANCE

(75) Inventor: John A. Rock, Roswell, GA (US)

(73) Assignee: Solvay Advanced Polymers, LLC, Alpharetta, GA (US)

( * ) Notice: Subject to any disclaimer, the term of this patent is extended or adjusted under 35 U.S.C. 154(b) by 0 days.

(21) Appl. No.: 09/543,113

(22) Filed: Apr. 5, 2000

Related U.S. Application Data

(60) Provisional application No. 60/128,132, filed on Apr. 7, 1999.

(51) Int. Cl.$^7$ .................................................. C08K 3/38
(52) U.S. Cl. ........................ 524/405; 524/462; 524/497; 524/500; 524/414
(58) Field of Search ................................ 524/405, 404, 524/462, 464, 497, 500, 516, 518, 519, 520; 525/535, 537, 540, 906, 282, 276

(56) References Cited

U.S. PATENT DOCUMENTS

| 5,189,115 A | | 2/1993 | Melquist ...................... 525/420 |
| 5,204,400 A | | 4/1993 | Kelly et al. .................. 524/405 |
| 5,916,958 A | * | 6/1999 | Kelly et al. .................. 524/497 |
| 6,075,100 A | * | 6/2000 | El-Hibri ...................... 525/535 |

FOREIGN PATENT DOCUMENTS

| EP | 307670 A1 | * | 3/1989 |
| EP | 440433 | | 8/1991 |
| WO | WO 83/03147 | * | 10/1983 |
| WO | WO9200348 | | 1/1992 |

* cited by examiner

Primary Examiner—Edward J. Cain
Assistant Examiner—Katarzyna Wyrozebski Lee
(74) Attorney, Agent, or Firm—McDermott, Will & Emery

(57) ABSTRACT

Poly(biphenyl ether sulfone) resins are improved in resistance to UV yellowing when blended with up to 50 wt % polyetherimide. Flame retardant blends of poly(biphenyl ether sulfone) and polyetherimide are particularly useful in fabricating appearance parts for aircraft interiors.

8 Claims, No Drawings

POLY(BIPHENYL ETHER SULFONE) RESINS HAVING IMPROVED UV YELLOWING RESISTANCE

This application claims the benefit of U. S. Provisional Application No. 60/128,132 filed Apr. 7, 1999.

BACKGROUND OF THE INVENTION

This invention is directed to a molding resin composition comprising a poly(biphenyl ether sulfone) resin. More particularly the invention is directed to improved molding resin compositions having reduced tendency toward yellowing comprising poly(biphenyl ether sulfone) resin, and to a method for improving the yellowing resistance of poly(biphenyl ether sulfone) resins.

Poly(aryl ether sulfone) resins have been known for nearly three decades. They are tough linear polymers that possess a number of attractive features such as excellent high temperature resistance, good electrical properties, and very good hydrolytic stability. A variety of poly(aryl ether sulfones) are commercially available, including the polycondensation product of 4,4'-dihydroxydiphenyl sulfone with 4,4'-dichlorodiphenyl sulfone and the polymer of bisphenol-A and 4,4'-dichlorodiphenyl sulfone. These and other poly(aryl ether sulfone) resins are widely disclosed and described in the art, including in U.S. Pat. No. 4,108,837 and Canadian Patent No. 847,963. A third commercial poly(aryl ether sulfone) is the poly(biphenyl ether sulfone) resin available from Amoco Performance Products, Inc. under the trademark of Radel® R. The latter resin may be described as the product of the polycondensation of biphenol with 4,4'-dichlorodiphenyl sulfone.

Because of their excellent mechanical and thermal properties coupled with outstanding hydrolytic stability, poly(aryl ether sulfones) have found wide application, including in extruded goods and molded articles for use where exposure to severe environments is contemplated. Parts molded from poly(biphenyl ether sulfone) resins have substantially better mechanical properties than those molded from other readily available poly(aryl ether sulfone) resins, and are generally more chemically resistant.

Although poly(aryl ether sulfone) resins are also highly resistant to mineral acids and salt solutions, when exposed to polar organic solvents, they readily stress crack. Where increased environmental stress crack resistance is desired, blends of poly(aryl ether sulfone) resins have been employed to make them more acceptable for use in a solvent environment without substantially affecting their mechanical or electrical properties. Blends comprising polyetherimide resins and poly(aryl ether sulfone) resins are disclosed in U.S. Pat. No. 4,293,670 to have significantly improved environmental stress crack resistance and good impact strength. A variety of other blends have also been described in the art for these purposes including, for example, blends of poly(aryl ether sulfone) resins with polyamide-imides as well as blends with poly(aryl ether ketone) resins. Copolymers with improved stress-cracking resistance are also known in the art including, for example, co-poly(biphenyl ether sulfone) resins comprising bisphenol A moieties as disclosed and described in U.S. Pat. No. 5,164,166.

Poly(biphenyl ether sulfone) resins are known to exhibit good mechanical properties at elevated temperatures and have excellent high temperature stability. These resins may be combined with suitable flame retarding additives to provide highly desirable chemically-resistant, flame retardant, low heat release materials for use in aircraft interiors and the like, as disclosed in U.S. Pat. No. 5,204,400, and are particularly useful for these purposes when employed in blends with polyaryl ether ketones.

One deficiency of formulations based on poly(biphenyl ether sulfone) resins is the tendency of these resins to yellow rapidly when exposed to ultraviolet radiation such as may be encountered when exposed to sunlight or fluorescent lighting. Although the effect on mechanical properties may be minimal, the cosmetic appearance of articles made from such resins may become severely degraded. The color stability of resin formulations, and particularly those supplied in light colors and intended to be used in fabricating articles visible to the consumer, for example, in trim panels and similar appearance parts of aircraft interiors, may be the determining factor in deciding the commercial acceptability of such goods.

BRIEF SUMMARY OF THE INVENTION

This invention is directed to compositions having improved resistance to yellowing comprising a poly(biphenyl ether sulfone) resin, and to a method for improving the yellowing resistance of poly(biphenyl ether sulfone) resins by combining said resin with particular levels of a polyetherimide resin to form a blend. Molded articles comprising such blends have improved resistance toward yellowing and may be further combined with suitable flame retarding additives to provide highly desirable low heat release materials useful in the manufacture of components for aircraft interiors and the like.

DETAILED DESCRIPTION OF THE INVENTION

Briefly, the poly(biphenyl ether sulfone) resins useful in the practice of this invention comprise the structural unit

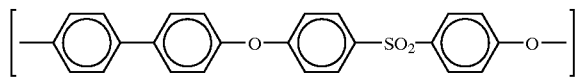

The polymer may further comprise up to 50 mole percent, preferably up to about 25 mole percent, still more preferably no more than about 10 mole percent additional arylene sulfone units with the structure

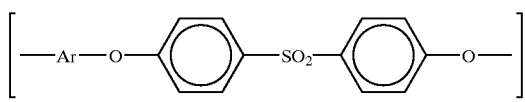

wherein Ar is a monoarylene moiety such as p-phenylene, m-phenylene or the like, or is a diarylene moiety other than biphenyl, for example a bisphenol A, bisphenol S or similar moiety. The presence of these additional arylene sulfone units may have a detrimental effect on the overall balance of properties, hence polymers containing only biphenylether sulfone moieties will generally be preferred.

Poly(biphenyl ether sulfone) resins may be prepared by any of the variety of methods well known in the art for the preparation of poly(aryl ether) resins. Two methods, the carbonate method and the alkali metal hydroxide method, are widely known and used for this purpose. In the alkali metal hydroxide method, disclosed for example in U.S. Pat. No. 4,108,837 and in U.S. Pat. No. 4,175,175, a double alkali metal salt of a dihydric phenol is contacted with a dihalobenzenoid compound in the presence of a sulfur containing solvent as herein above defined under substantially anhydrous conditions. The carbonate method, in which at least one dihydric phenol and at least one dihalobenzenoid compound are heated, for example, with sodium carbonate or bicarbonate and a second alkali metal carbonate or bicarbonate is also widely disclosed in the art, for example in U.S. Pat. No. 4,176,222.

The reduced viscosity of the poly(biphenyl ether sulfone) resins useful in the practice of the invention, measured in an appropriate solvent such as methylene chloride, chloroform, N-methylpyrrolidone or the like, will be at least 0.3 dl/g, preferably at least 0.4 dl/g, and the polymer will be film-forming. Generally, resins having a reduced viscosity in the range of from about 0.3 to about 1.0 dl/g will be readily processable thermally and will be useful for these purposes. Very high molecular weight resins, typically those having a reduced viscosity greater than about 1.0 dl/g, may also be found useful, however, such resins will have a high melt viscosity and be difficult to process and will therefore not be preferred.

Polyetherimides suitable for use in this invention are also well known in the art and are described in, for example, U.S. Pat. Nos. 3,847,867, 3,838,097 and 4,107,147. The polyetherimides may be further described as comprising units of the following structure:

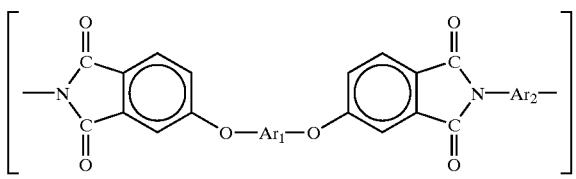

wherein $Ar_1$ and $Ar_2$ are independently selected from substituted and unsubstituted divalent aromatic radicals and more particularly may be monoarylene moieties such as p-phenylene, m-phenylene or the like, or selected from diarylene moieties such as, for example a biphenyl, bisphenol A, bisphenol S or similar moiety. Isomeric structures wherein the ether-linked moiety —O—$Ar_1$—O— may be attached to the 3 and 3' positions of the respective aromatic rings are also contemplated as within the description of suitable polyetherimides.

These polyetherimides are readily prepared by any of the methods well known in the art such as those disclosed in, for example, U.S. Pat. Nos. 3,833,544, 3,887,588, 4,017,511, 3,965,125 and 4,024,110. Generally, suitable polyetherimides may be made by the reaction of an aromatic bis(ether anhydride) with one or more aromatic diamines selected from m-phenylene diamine, p-phenylene diamine, a diaminodiphenyl ether, a diaminodiphenyl sulfone, a diaminodiphenyl ketone, an aryl-alphatic diamine such as bis-(4-aminophenyl)methane, 2,2-bis-(4-aminophenyl)propane or the like. Also useful in the practice of this invention are the corresponding copolymers wherein up to 50 mole %, preferably no more than 25 mole % of the anhydride units are derived from aromatic dianhydrides such as benzene tetracarboxylic acid dianhydride, benzophenone tetracarboxylic acid dianhydride, diphenylether tetracarboxylic acid dianhydride, napthalene tetracarboxylic acid dianhydride or the like.

Suitable polyetherimides are readily available from commercial sources. Particularly suitable are those containing units derived from 2,2-bis(4-(2,3-dicarboxyphenoxy) phenyl)-propane dianhydride and m-phenylenediamine having the structural formula:

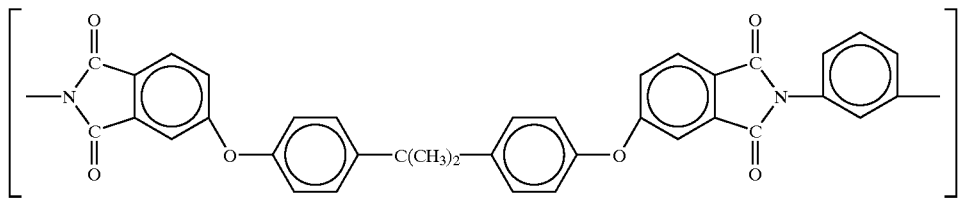

available from GE Plastics Company under the tradename Ultem® polyetherimide resin in a variety of grades including Ultem 1010. Also available commercially from the same source are polyetherimide copolymers such as Ultem® 6000 polyetherimide resin.

Generally, polyetherimides useful in the practice of the invention will have a reduced viscosity greater than 0.2 dl/g, preferably 0.35 to 0.7 deciliters per gram when measured in m-cresol at 25° C. Although resins with a reduced viscosity as great as 1.2 dl/g may be found useful, the higher viscosity resins are generally very difficult to process and thus will be less preferred.

The blends of the invention may comprise from about 95 to about 50 wt % poly(biphenyl ether sulfone) and, correspondingly, from about 50 to about 5 wt % of the polyetherimide component. Preferably, the blends will comprise no more than about 40 wt % of the polyetherimide component. Although blends containing higher levels of polyetherimide may exhibit excellent non-yellowing characteristics, polyetherimides are known as generally being brittle resins, and blends containing high levels of these resins possess an inferior balance of mechanical properties. Such blends will therefore not be preferred for most uses.

The compositions of this invention may be prepared by any conventional mixing method commonly employed in the resin compounding art. For example, the poly(aryl ether sulfone) and the polyetherimide may be combined in powder or granular form and fed to an extruder and extruded into strands. The strands may then be chopped to provide pellets for use in a subsequent molding operation.

The invented compositions may be further compounded with other additives including plasticizers; pigments; flame retarding additives, reinforcing fillers other reinforcement such as glass or carbon fibers or the like, thermal-oxidative stabilizers; ultraviolet light stabilizers, processing aids, impact modifiers and the like. Particularly attractive for use in a variety of applications are flame retardant resin formulations comprising the blends of this invention and flame retardants containing zinc borates in combination with fluorocarbon polymers and, optionally, titanium dioxide such as are disclosed in U.S. Pat. No. 5,204,400, the disclosure of which is incorporated by reference.

The invention will be better understood by considering the following examples. These examples are offered to illustrate various embodiments of the invention, but are not intended to in any way limit the scope thereof.

EXAMPLES

The component materials employed in following examples, and the abbreviations therefor, include:

PS-R: Poly(biphenyl ether sulfone) containing units of the formula

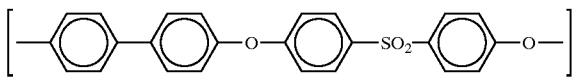

obtained. as RADEL-R® polysulfone resin from Amoco Polymers, Inc. Grades employed for these Examples include R-5100 and R-5700.

PEI: Polyetherimide resin obtained from GE Plastics Company as Ultem® 1010 polyetherimide resin.

PEEK: Polyether ether ketone resin, obtained from Victrex USA as Victrex PEEK® 150P.

$TiO_2$: Titanium dioxide, pigment grade, obtained commercially from a variety of sources.

PTFE: Polytetrafluoroethylene of low molecular weight (non-fibrillating), obtained from Ausimont as POLYMIST® F5A.

ZnB: Anhydrous zinc borate, obtained as Firebreak® 500 from U.S. Borax.

Blend Preparation, Molding and Testing

All materials were prepared by first dry blending the components using a mechanical blender then compounding using a Berstorff ZE-25, 25 mm co-rotating twin-screw extruder. Processing conditions varied with the materials compounded; extruder barrel temperatures were in the range 290–365° C.; die temperature from 335–355° C.; melt temperature from 350–395° C. Screw speeds were in the range 170 to 250 rpm.

Standard ASTM test specimens for each of the compounded materials were injection molded on Battenfeld or Arburg injection molding machines having 3 ounce injection capacities. Test plaques were molded and tested for UV yellowing and Dynatup Impact.

Test methods employed in the following Examples include: Melt Flow Rate (MFR), determined following the procedures of ASTM D1238, (380° C., 2.16 Kg load); tensile testing was carried out in accordance with ASTM-D638; Izod Impact following ASTM D256; Flexural testing by ASTM D790; and Dynatup impact was determined according to ASTM D3763.

UV yellowing was determined by exposing 2"×3" color display specimens or chips to a fluorescent lamp apparatus consisting of two GE Shoplite" F40/Shop fluorescent tubes in a fixture suspended over a supported panel (height adjustable using a laboratory jack). The chips were placed approximately 4 in below the lamps and exposed for the indicated time periods. Color change was determined using a BYC Gardner Spectragard spectrophotometer using D6500 illuminant @ 10°, large reflectance specular included, values were measured on CIE Lab coordinates. The color value obtained was compared to that of an unexposed chip and reported as the difference, or $\Delta E$ Flammability Testing: United States Government standards for the flame resistance of construction materials used for aircraft interiors are set out in the 1986 amendments to Part 25-Airworthiness Standards—Transport Category Airplanes of Title 14, Code of Federal Regulations (see 51 Federal Register 26206, Jul. 21, 1986 and 51 Federal Register 28322, Aug. 7, 1986). The flammability standards are based on heat calorimetry tests developed at Ohio State University (hereinafter "OSU Tests"). Such OSU Tests are described in the above-cited amendments to 14 CFR Part 25 and are incorporated herein by reference. These tests measure the two minute total heat release (in kilowatts minute per square meter of surface area, $kW-min/m^2$) as well as the maximum heat release rate (in kilowatts per square meter of surface area, $kW/m^2$) over the first five minutes for the material being tested, when burned under a specified set of conditions. The 1990 standards require engineering thermoplastics to have both of these heat release measurements under 65. The heat release data is an average of three or five tests of the sample.

Examples 1–3

In Examples 1–3, blends comprising poly(biphenyl ether sulfone) PS-R and PEI resin in ratios over a range from 75/25 to 25/75, together with Control Examples A and B comprising the base resins, were prepared, molded and tested for UV yellowing resistance and impact properties. Comparison Example C-1, a prior art aircraft interior resin blend comprising PS-R resin and a poly(ether ether ketone) resin, was similarly molded and tested for comparison. The blend compositions and the results of the testing are summarized in the following Table I.

TABLE I

Poly(biphenyl ether sulfone) PEI Blends

|  | A | 1 | 2 | 3 | B | C-1 |
|---|---|---|---|---|---|---|
| PS-R[1] (pbw) | 100 | 75 | 50 | 25 | 0 | 65 |
| PEI resin (pbw) | 0 | 25 | 50 | 75 | 100 | 0 |
| PEEK resin (pbw) | 0 | 0 | 0 | 0 | 0 | 35 |
| $\Delta E$* | 9.37 | 3.83 | 2.04 | 1.38 | 1.02 | 5.09 |
| 7 day UV exposure |  |  |  |  |  |  |
| Dynatup impact |  |  |  |  |  |  |
| Max. load (lb) | 1246 | 1102 | 1270 | 1384 | 196 | 1225 |
| Max. load energy (ft-lb) | 22.8 | 17.4 | 19.3 | 20.0 | 1.0 | 22.0 |
| failure mode | ductile | ductile | ductile, cracks | brittle | brittle | ductile |
| MFR, 380° C. (g/10 min.) | 11.2 | 13.6 | 17.2 | 21.7 | 26.6 | 17.0 |

Notes:
[1]PS-R = R-5700, MFR 13.5 g/10 min;
*$\Delta E$ = Color change; comparison reference was an unexposed sample of the same formulation; All formulations contain 10 pbw $TiO_2$ pigment. For compounding details and test methods, see text.

It will be seen from a comparison of the impact properties of Examples 1–3 with that of Control Examples A and B that the excellent impact properties of the poly(biphenyl ether) sulfone resin are detrimentally affected when blended with the PEI resin. Although the over all impact properties associated with poly(biphenyl ether sulfone) resins remain high, even at the 75 pbw PEI level, the blend composition containing a high level of PEI, Example 3, exhibits brittle failure. Compare Control Example A and Examples 1–3. The change in melt flow character over the composition range, however, appears to be linearly related to the overall composition of the blend.

Examples 4–6 and Control Examples C and D

Additional blends of PEI resin and PS-R poly(biphenyl ether sulfone) resin, together with Control Examples C and D, the base resins employed for these blends, were prepared and injection molded to provide specimens for tensile testing. The mechanical properties of the blends are summarized in the following Table II.

TABLE II

Poly(biphenyl ether sulfone)/PEI Blends - Mechanical Properties

| Example No.: | C | 4 | 5 | 6 | D |
|---|---|---|---|---|---|
| PS-R (pbw | 100 | 75 | 50 | 25 | 0 |
| PEI (pbw | 0 | 25 | 50 | 75 | 100 |
| Tens. Str. (Kpsi) | 10.3 | 10.6 | 12.3 | 13.0 | 13.8 |
| E (%) | 91 | 71 | 89 | 69 | 40 |
| Tens. Mod. (Kpsi) | 336 | 331 | 374 | 430 | 493 |
| Flex. Mod. (Kpsi) | 350 | 393 | 429 | 471 | 471 |
| Flex. Str. (Kpsi) | 13.2 | 15.4 | 16.8 | 19.1 | 19.9 |
| Notched Izod (ft-lb/in) | 14.8 | 2.2 | 1.6 | 1.3 | 1.1 |
| Tens. Impact (ft-lb/in$^2$) | 191 | 193 | 182 | 112 | 106 |

It will be seen from a comparison of the impact properties of Examples 4–6 with that of Control Examples C and D that the excellent impact properties of the poly(biphenyl ether) sulfone resin are detrimentally affected when blended with the PEI resin. The notch sensitivity of these blends is reflected in the sharp reduction in Izod impact value, even at the level of 25 pbw PEI. Compare Control Example C and Examples 4–6. The tensile impact properties of Examples 4 and 5 demonstrate the substantial toughness of formulations comprising less than about 50 pbw PEI resin. As the proportion of PEI resin component is further increased the blends become brittle. Compare Examples 5 and 6.

Examples 7–9 and Control Example E

Blends comprising Poly(biphenyl ether sulfone) resin and PEI resin in ratios over the range of from 75/25 to 55/45 were prepared and molded substantially as described for Examples 1–4, and tested for UV yellowing and impact properties. The PS-R employed in these blends was similarly molded and tested. The blends and properties are summarized in the following Table III.

TABLE III

Poly(biphenyl ether sulfone) PEI Blends

| Example No.: | E | 7 | 8 | 9 |
|---|---|---|---|---|
| PS-R$^1$ (pbw) | 100 | 75 | 65 | 55 |
| PEI resin (pbw) | 0 | 25 | 35 | 45 |
| ΔE* | | | | |
| 14 day UV exposure: | 4.69 | 2.93 | 3.26 | 3.72 |
| 28 day UV exposure: | 7.72 | 4.06 | 3.81 | 3.81 |
| Dynatup impact | | | | |
| Max. load (lb) | 913 | 896 | 957 | 975 |
| Max. load energy (ft-lb) | 19.0 | 20.8 | 19.6 | 19.6 |
| failure mode: | ductile | ductile | ductile, | crack, |

TABLE III-continued

Poly(biphenyl ether sulfone) PEI Blends

| Example No.: | E | 7 | 8 | 9 |
|---|---|---|---|---|
| | | | cracks | brittle |
| MFR, 380° C. (g/10 min.) | 8.4 | 10.3 | 12.0 | 13.5 |
| Tens. Str. (Kpsi) | 10.9 | 12.7 | 13.1 | 13.8 |
| Elong. at break (%) | 84 | 73 | 67 | 76 |
| Flex. Mod. (Kpsi) | 363 | 408 | 418 | 442 |
| Flex. Str. (Kpsi) | 16.7 | 19.1 | 19.7 | 21.0 |
| Notched Izod (ft-lb/in) | 11.9 | 1.6 | 1.6 | 1.1 |

Notes:
$^1$PS-R = R-5100, MFR 16.8 g/10 min;
*ΔE = Color change; comparison reference was an unexposed sample of the same formulation; All formulations contain 10 pbw TiO$_2$ pigment. For compounding details and test methods, see text.

Again it will be seen that the blends become increasingly brittle with increasing levels of PEI resin. For these compositions comprising a higher melt flow resin, at 65:35 PS-R:PEI ratio the Dynatup impact specimen developed cracks, but exhibited ductile failure; at a 55:45 ratio the Dynatup impact specimen cracked, then broke and exhibited brittle failure. The notch or crack sensitivity of these blends is shown by the low Izod impact properties of the Examples. Thus, while blends comprising PEI resins at levels as great as 50 wt % may exhibit moderate impact resistance, for applications where good ductility and a high level of impact resistance is an important consideration the preferred compositions will comprise less than 50 wt % PEI, and more preferably less than about 35 wt % PEI.

Examples 10 and 11, Control Examples G and H, and Comparison Examples C-2 and C-3

Blend compositions comprising a 65:35 PS-R:PEI ratio were further combined with a flame retardant and a pigment, molded and tested. Control formulations comprising the flame retarded base resins were similarly prepared, molded and tested as Control Examples G–H.

Flame-retarded prior art aircraft interior resin blend formulations comprising PS-R resin and a PEEK poly(ether ether ketone) resin, were similarly molded and tested to provide Comparision Examples C-2 and C-3.

The compositions and the test results are summarized in the following Table IV.

TABLE IV

Flame Retardant Poly(biphenyl ether sulfone) PEI Blends

| Example No.: | G | H | 10 | 11 | C-2 | C-3 |
|---|---|---|---|---|---|---|
| PS-R$^1$ (pbw) | 100 | — | 65 | 65 | 65 | 65 |
| PEI resin (pbw) | — | 100 | 35 | 35 | — | — |
| PEEK resin (pbw) | — | — | — | — | 35 | 35 |
| PTFE (wt %) | 1.5 | 1.5 | 1.5 | 1.5 | 1.5 | 1.5 |
| Zn Borate (wt %) | 4.0 | 4.0 | 1.0 | 4.0 | 1.0 | 4.0 |
| TiO$_2$ (wt %) Pigment$^2$ | 8 | 8 | 8 | 2 | 8 | 2 |
| Yellow (wt %) | 0.08 | 0.08 | 0.08 | 0 | 0.08 | 0 |
| Black (wt %) | 0 | 0 | 0 | 0.28 | 0 | 0.28 |
| ΔE* | | | | | | |
| 7 day UV exposure: | 7.68 | 2.06 | 2.40 | 0.57 | 2.76 | 0.62 |
| 14 day UV exposure: | 12.17 | 3.06 | 5.23 | 0.68 | 6.72 | 1.16 |
| Dynatup | | | | | | |

TABLE IV-continued

Flame Retardant Poly(biphenyl ether sulfone) PEI Blends

| Example No.: | G | H | 10 | 11 | C-2 | C-3 |
|---|---|---|---|---|---|---|
| impact | | | | | | |
| Max. load (lb) | 1170 | 270 | 1317 | 1240 | 1320 | 1200 |
| Max. load energy (ft-lb) | 21.5 | 1.1 | 24.6 | 22.9 | 24.8 | 27.2 |
| failure mode: | ductile | brittle | ductile | ductile | ductile | ductile |
| Tens. Str. (Kpsi) | 10.4 | 15.4 | 12.5 | 12.7 | 11.5 | 11.3 |
| Elong. at break (%) | 56 | 13 | 36 | 31 | 57 | 112 |
| Notched Izod (ft-lb/in) | 3.4 | 0.5 | 1.4 | 1.2 | 1.6 | 1.8 |
| OSU | | | | | | |
| 2 min heat rel. | −8 | −5 | −6 | −3 | −8 | −7 |
| Peak heat rel. | 9 | 27 | 22 | 33 | 12 | 7 |

Notes:
[1]PS-R = R-5100 - MFR 16.7 g/10 min;
[2]Yellow = Ferro V-9400, Black = MPC channel black;
*ΔE = Color change; comparison reference was an unexposed sample of the same formulation. For compounding details and test methods, see text.

Flame retarded and pigmented blend compositions according to the invention, Examples 10 and 11, will be seen to have better yellowing resistance than the flame retarded PS-R formulation of Control Example G. The compositions of Examples 10 and 11 are also seen to be more yellowing resistant than the correspondingly pigmented prior art flame-retardant PS-R/PEEK formulations, Comparison Examples C-2 and C-3.

The invention will thus be seen to be a poly(biphenyl ether sulfone) resin composition having improved resistance to yellowing, said composition comprising from about 95 to about 50 wt. % poly(biphenyl ether sulfone) and from about 50 to about 5 wt. % of a polyetherimide, more preferably from about 95 to about 60 wt. % poly(biphenyl ether sulfone) and from about 40 to about 5 wt. % of a polyetherimide. The compositions of this invention exhibit reduced tendency to yellowing on exposure to UV light, and the invention thus may be further characterized as a method for improving the UV yellowing resistance of poly(biphenyl ether sulfone) resins comprising blending therewith up to about 50 wt % polyetherimide, based on total weight of the said resin components. The compositions of this invention may be fabricated using standard injection molding and thermoforming equipment and processes, and may be useful in producing film, sheet and profile using extrusion processes well known and widely practiced for the fabrication of thermoplastic resins. Suitably flame retarded, the compositions of this invention are particularly useful in the manufacture of extruded and molded goods for aircraft interior applications.

Although the invention has been described and illustrated by way of specific embodiments set forth herein, those skilled in the art will recognize that a variety of homopolymer and copolymer polyetherimide resins may also be found useful for improving the yellowing resistance of poly (biphenyl ether sulfone) resins. Still further modifications and variations in the processes employed herein will be readily apparent to those skilled in the resin formulating and fabricating art and in the extrusion arts, and such variations and modifications will be understood to lie within the scope of the invention as defined by the appended claims.

I claim:

1. A flame retarded composition comprising poly(biphenyl ether sulfone), a zinc borate flame retardant, a fluorocarbon polymer and titanium dioxide, wherein said composition further comprises from about 5 to about 40 wt. % of a polyetherimide resin having units of the following structure;

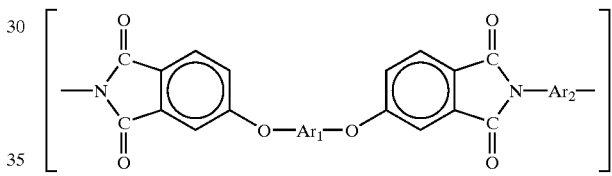

wherein $Ar_1$ and $Ar_2$ are radicals independently selected from the group consisting of p-phenylene, m-phenylene, biphenyl, bisphenol A and bisphenol S, based on combined weight of said poly(biphenyl ether sulfone) and said polyetherimide resin.

2. The composition of claim 1 wherein said polyetherimide comprises units having the following structure:

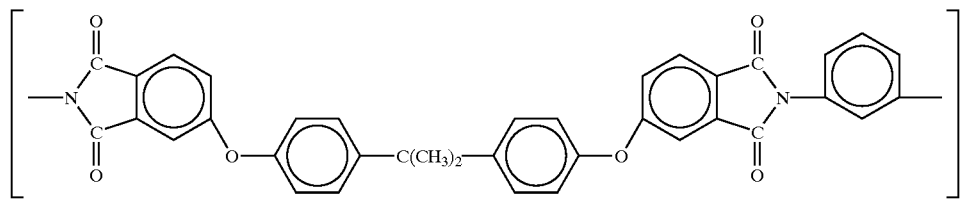

3. The composition of claim 1 comprising from about 2 to about 8 pbw said zinc borate, from about 1 to about 8 pbw said fluorocarbon polymer and from about 3 to 12 pbw titanium dioxide, per hundred parts combined weight of said poly(biphenyl ether sulfone) and said polyetherimide.

4. An article comprising a blend of poly(biphenyl ether sulfone), a zinc borate flame retardant, a fluorocarbon polymer, titanium dioxide and from about 5 to about 40 wt. % of a polyetherimide comprising units having the following structure:

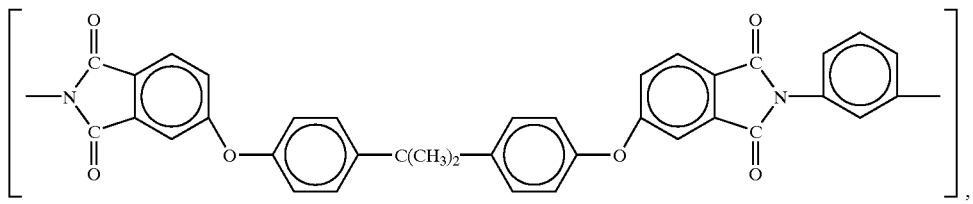
, based on combined weight of said poly(biphenyl ether sulfone) and said polyetherimide resin.

5. The article of claim 4 wherein said article is formed by extruding said blend.

6. The article of claim 4 wherein said article is formed by thermoforming extruded sheet comprising said blend.

7. The article of claim 4 wherein said article is formed by injection molding said blend.

8. A method for improving the UV yellowing resistance of poly(biphenyl ether sulfone) comprising the step of blending therewith from about 5 to about 40 wt. % of a polyetherimide comprising units having the following structure:

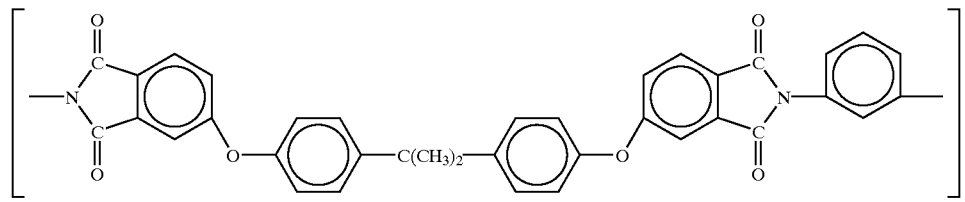

based on combined weight of said poly(biphenyl ether sulfone) and said polyetherimide resin.

\* \* \* \* \*